Nov. 23, 1965   C. J. SCHROEDER   3,219,226
FOOD SERVING DEVICE
Filed July 26, 1963

INVENTOR.
Clarence J. Schroeder
BY
Newton, Hopkins & Jones
ATTORNEYS 3,219,226
FOOD SERVING DEVICE
Clarence J. Schroeder, Box 68, Murphy, N.C.
Filed July 26, 1963, Ser. No. 297,845
3 Claims. (Cl. 220—23.83)

This invention relates to a food serving device, and is more particularly concerned with a food serving device having a serving bowl with a smaller serving bowl detachably mounted thereon.

In the past, a variety of serving bowls have been provided with various means of attaching one bowl to another. With the popularity of mixtures to be served with crackers, potato chips and the like, many of these previous food serving devices have placed a small bowl holding the mixture, or dip on or adjacent to a larger bowl holding the crackers or the like. However, most of these previous food serving devices have required a completely separate framework for each bowl or have required clips, brackets or the like to hold one bowl in position with respect to the other.

The device of the present invention provides a plurality of serving bowls in which one or more bowls can be attached to a larger bowl. No separate framework for each bowl and no clips, clamps or brackets are required. Moreover, none of the bowls is noticeably deformed and each bowl appears as a normal, attractive serving bowl.

The bowls of the present invention include a small bowl having a groove in the bottom. The groove is shaped so that the upper edge of a larger bowl can be received in the groove and the small bowl will rest on the upper edge of the large bowl. The groove in the small bowl and the upper edge of the large bowl are formed so that the small bowl is firmly supported, yet can be easily lifted off. The groove in the bottom of the small bowl does not detract from the appearance of the small bowl, nor does the groove detract from the usefulness of the small bowl as a separate bowl.

These and other features and advantages of the present invention will become apparent from consideration of the following specification when taken in conjunction with the accompanying drawings in which.

Figure 1:
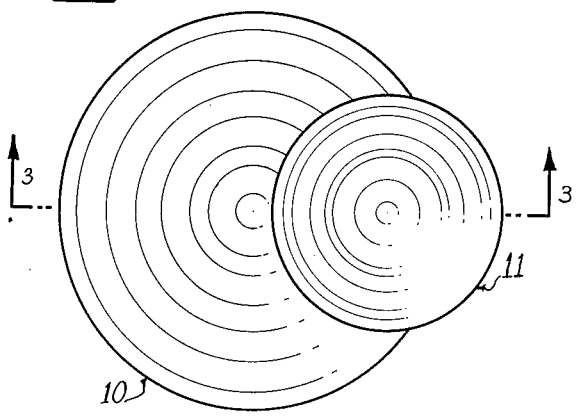
FIG. 1 is a top plan view of the food serving device showing a small bowl mounted on a large bowl.

It should be understood that the terms *large bowl* and *small bowl* are relative. A large bowl is the bowl on which another bowl is mounted. The large bowl, in some instances, may be a small bowl relative to another bowl, since it may, in turn, be mounted on the even larger bowl. Likewise, a small bowl is a bowl to be mounted on another bowl and may be a large bowl relative to an even smaller bowl mounted on its edge.

Referring now to the drawings and to that particular embodiment of the invention chosen for purposes of illustration, the device includes a large bowl 10 and a small bowl 11. The small bowl 11 has a groove 12 extending completely across its bottom 14 as will be seen in FIG. 4. The groove 12 is so shaped that the small bowl 11 will rest on the upper edge 15 of the large bowl 10, with the edge 15 received within the groove 12.

Figure 6:
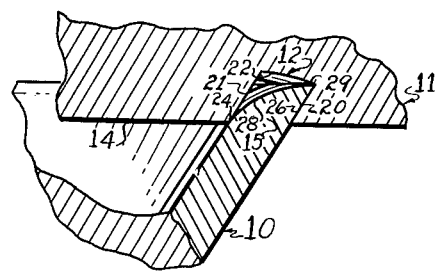
FIG. 6 is an enlarged cross-sectional view showing the mounting means.
Figure 3:
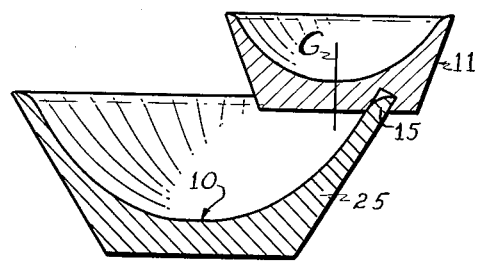
FIG. 3 is a cross-sectional view taken along the line 3—3 in FIG. 1.

Attention is directed to FIGS. 3 and 6 of the drawings which show the cooperation of the groove 12 and the edge 15. It will be seen that the groove 12 includes an outer locking surface 20 and an inner surface 21 joined by a top surface 22. The line of intersection of the inner surface 21 of the groove 12 with the bottom 14 of the bowl 11 forms a lip 24.

The large bowl 10 is formed with outwardly flaring walls 25 having the upper edge 15. The outer surface 26 of the edge 15 is slanted and the inner surface 28 of the edge 15 curves outwardly so as to converge with and join outer surface 26 to form a circular ridge 29.

Figure 4:
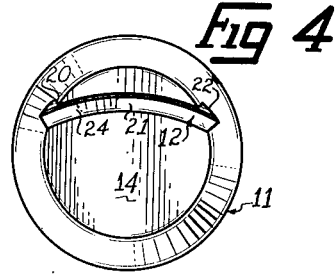
FIG. 4 is a bottom plan view of the small bowl.
Figure 5:
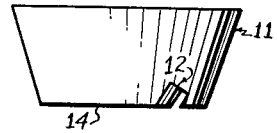
FIG. 5 is an elevational view of the small bowl detached from the large bowl.
Figure 2:
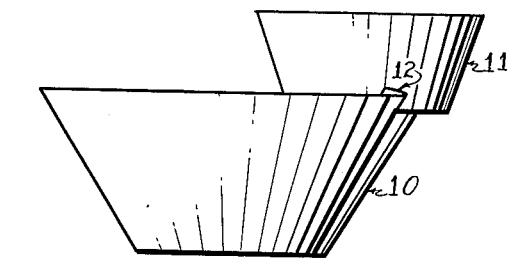
FIG. 2 is an elevational view of the device shown in FIG. 1.

The surfaces 26 and 28 are surfaces of revolution, but are seen in FIGS. 3 and 6 as lines. FIG. 4 clearly reveals the complete shape of the groove 12. As stated above, the groove 12 extends completely across the bottom 14 of the small bowl 11. The groove 12 is curved, being substantially of the same curvature as the upper edge 15 of the large bowl 10. More specifically, the outer locking surface 20 of the groove 12 has substantially the same radius as the outer surface 26 of the edge 15 and the lip 24 of the groove 12 has a radius substantially equal to the radius of the inner surface 28 of the edge 15 where the lip 24 contacts the inner surface 28 when the edge 15 is inserted in the groove 12 as described below.

From the foregoing description, the operation of the food serving device should be obvious. The small bowl 11, having the groove 12 in the bottom 14 thereof is placed on the edge 15 of the large bowl 10. In placing the small bowl 11 on the large bowl 10, the small bowl 11 is held horizontally and moved down toward the edge 15. The direction of downward movement of the small bowl 11 is along a line of extension of the outer surface 26 of the edge 15. In this manner, the upper edge 15 is inserted into the groove 12 without tilting the small bowl 11, and without any twisting or other manipulations of either bowl.

As the edge 15 enters the groove 12, the outer surface 26 of the edge 15 will receive the outer locking surface 20 of the groove 12, the two surfaces 20 and 26 being contiguous. The edge 15 will enter the groove 12 until the circular ridge 29 of the top edge 15 abuts the top surface 22 of the groove 12. As stated above, groove 12 is designed so that when the circular ridge 29 of the edge 15 abuts the surface 22, the lip 24 of the small bowl 11 has the same radius as and will contact the surface 28 of the large bowl 10.

When the small bowl 11 is disposed on the large bowl 10 in the manner described, the center of gravity of the bowl will act downwardly at the arrow G in FIG. 3, tending to rotate the bowl 11 about the lip 24. However, the bowl 11 cannot rotate about the lip 24 because of the locking surface 20. The locking surface 20 is contiguous with and bears against the outer surface 26 of the edge 15 and prevents movement unless the bowl 11 slides upward and away from the position of the lip 24. The weight of the small bowl 11 will prevent the locking surface 20 from sliding upwardly and hence, the small bowl 11 cannot rotate about the lip 24 and will remain in the stationary position shown.

It will now be seen that the device of the present invention can be adapted to a wide variety of bowl configurations. It is simply necessary that each configuration have a pivot line, as defined by the lip 24 in the specific embodiment described, and a locking surface 20 which is arranged to prevent pivotal movement about the pivot line. Thus, when it be desired to dispose a small bowl 11 generally outside a large bowl 10 rather than over the large bowl 10, the upper edge 15 of a large bowl 10 can be turned slightly inward so that the inner surface 28 rather than the outer surface 26 acts with a locking surface 20 of a groove 12 arranged in the manner of the invention with respect to the bottom 14 of a small bowl 11.

Regardless of the bowl configuration, the groove 12 is insignificant in appearance and each of several small bowls can be provided with a groove 12 and mounted separately or together on a larger bowl 10. The groove 12 and the upper edge 15 can be easily formed in many ways. The groove 12 can be made by a simple routing operation in wood and similar materials, and can be cast in plastics, glass, etc. The edge 15 can be easily cut from wood, and is easily cast in many materials.

It will be understood that the embodiment here shown is by way of illustration only and is meant to be in no way restrictive; therefore, numerous changes and modifications may be made, and the full use of equivalents resorted to without departing from the spirit or scope of the invention as outlined in the appended claims.

I claim:

1. A food serving device comprising a first bowl and a second bowl, said first bowl having an annular outwardly sloping wall, the upper edge of which is curved and has an outer surface and an inner surface which converges toward the outer surface to form a circular ridge, said second bowl being smaller than said first bowl and having a bottom with a groove which extends completely across the said bottom, said groove being formed with substantially the same curvature and dimensions as the said circular ridge of the said outwardly sloping wall and being offset from the center of gravity of the said second bowl, said groove having: an outer locking surface disposed approximately parallel to the outer surface of the said outwardly sloping wall when the said first bowl and the said second bowl are both horizontal, an inner surface intersecting the said bottom of the said second bowl to form a pivot lip, and an upper surface between said inner surface and said outer locking surface; the arrangement of the groove and upper edge being such that said groove will receive said upper edge with the said outer locking surface of the groove being contiguous with the said outer surface of the said upper edge and with the said lip bearing against the said inner surface of the said upper edge when the first bowl and second bowl are both horizontal and the circular ridge of the said upper edge is engaging the said upper surface of the groove so as to support said second bowl on said first bowl in cantilever fashion.

2. A serving assembly of the type comprising upper and lower bowls arranged vertically with respect to each other, said lower bowl having a horizontally disposed circular base portion and a substantially annular side wall portion extending generally upward from said base portion to form an open mouth bowl, said annular sidewall portion having an inner surface, an outer surface and an upper edge, said upper bowl having a horizontally disposed circular base portion and a substantially annular sidewall portion extending generally upward from its said base portion to form an open mouth bowl, said upper bowl being smaller in size than said lower bowl, the base portion of said upper bowl being formed with an arcuate groove displaced from its center of gravity and sized to closely fit over the sidewall portion of said lower bowl, said arcuate groove being formed with an outer locking surface constructed to bear against said outer surface of the sidewall portion of said lower bowl, an inner surface constructed to rest against said inner surface of the sidewall portion of said lower bowl, and a top surface constructed to rest against said upper edge of the sidewall portion of the lower bowl, said arcuate groove being positioned and arranged in the base of said upper bowl so that said upper bowl can be selectively attached to the sidewall portion of the lower bowl by sliding the arcuate groove of the upper bowl over the sidewall portion of the lower bowl and the upper bowl is completely supported in spaced relation over said lower bowl in cantilever fashion by the forces transmitted from the sidewall portion of the said lower bowl to the surfaces of said arcute groove of said upper bowl, said arcuate groove being constructed and arranged to maintain said upper bowl in a substantially horizontal disposition when attached to said lower bowl.

3. A food serving assembly comprising a large open container and a small open container, said large container having a horizontally disposed base portion and a sidewall portion extending generally upward and outward from said base portion to form an open-mouthed container, said sidewall portion having an inner surface, an outer surface and an upper edge, said small container having a horizontally disposed base portion and a sidewall portion extending generally upward from its said base portion to form an open-mouthed container, the base portion of said small container being formed with a groove displaced from its center of gravity and sized to tightly fit over the sidewall portion of said lower container, said groove being formed with an outer locking surface disposed to bear against said outer surface of the sidewall portion of said large container, an inner surface constructed to rest against said inner surface of the sidewall portion of said large container, and a top surface constructed to rest against said upper edge of the sidewall portion of said large container, said groove being positioned and arranged in the base of said small container so that said small container is selectively attachable to the sidewall portion of said large container by sliding the groove of said small container over the sidewall portion of the large container and the small container is completely supported in spaced relationship over said large container in cantilever fashion by the forces transmitted from the sidewall portion of said large container to the surfaces of said groove of said small container.

References Cited by the Examiner

UNITED STATES PATENTS 2,602,309   7/1952   Doyle _____ 220—23.83
2,613,517  10/1952   Frantz _____ 220—23.83

THERON E. CONDON, *Primary Examiner.*